United States Patent [19]

Holtslag et al.

[11] Patent Number: 5,408,453
[45] Date of Patent: Apr. 18, 1995

[54] METHOD OF AND APPARATUS FOR OPTICALLY WRITING, READING AND ERASING A MULTI-PLANE RECORD CARRIER, AND RECORD CARRIER SUITABLE FOR SAID METHOD AND APPARATUS

[75] Inventors: Antonius H. M. Holtslag; Derk Visser, both of Eindhoven, Netherlands

[73] Assignee: U.S. Philips Corporation, New York, N.Y.

[21] Appl. No.: 674,493

[22] Filed: Mar. 25, 1991

[30] Foreign Application Priority Data

Dec. 21, 1990 [NL] Netherlands .......................... 9002841

[51] Int. Cl.$^6$ .............................................. G11B 7/09
[52] U.S. Cl. ................... 369/44.23; 369/44.28; 369/44.37; 369/44.38; 369/94; 369/112; 369/275.4; 369/284
[58] Field of Search ............... 369/44.11, 44.14, 44.37, 369/44.28, 44.41, 44.23, 112, 44.38, 94, 278, 279, 32, 275.2, 275.3, 275.4, 280, 281, 283, 284, 286, 54, 58

[56] References Cited

U.S. PATENT DOCUMENTS

| | | |
|---|---|---|
| 3,689,899 | 9/1972 | Franaszek . |
| 3,876,842 | 4/1975 | Bouwhuis . |
| 3,999,009 | 12/1976 | Bouwhuis . |
| 4,023,033 | 5/1977 | Bricot et al. . |
| 4,337,532 | 6/1982 | Oprendi et al. ........................ 369/84 |
| 4,491,940 | 1/1985 | Tinet . |
| 4,533,826 | 8/1985 | Van Alem . |
| 4,665,310 | 5/1987 | Heemskerk . |
| 4,959,824 | 9/1990 | Ueda et al. ........................ 369/44.14 |
| 5,033,040 | 7/1991 | Fujita ................. 369/44.37 |
| 5,097,464 | 3/1992 | Nishiuchi et al. ................... 369/112 |

FOREIGN PATENT DOCUMENTS

| | | |
|---|---|---|
| 234418A | 9/1988 | Japan . |
| 298836A | 12/1988 | Japan . |
| 2036410 | 6/1980 | United Kingdom . |

*Primary Examiner*—W. R. Young
*Assistant Examiner*—Muhammad Edun
*Attorney, Agent, or Firm*—David R. Treacy

[57] ABSTRACT

A method of and an apparatus for writing and reading and/or erasing a multilayer record carrier (1) having a guide plane (2) and a plurality of recording planes (4) are described, using a guide beam (5) which cooperates with the guide plane (2) and a scanning beam (6) for at least writing in the recording planes (4). During writing the position of the scanning focus (36) formed by the scanning beam (6) is coupled to the focus (11) of the guide beam (5) which is actively controlled by using guide information which is present in the guide plane (2). During reading the scanning beam (6) is actively controlled by its own servosystem (20–28).

31 Claims, 3 Drawing Sheets

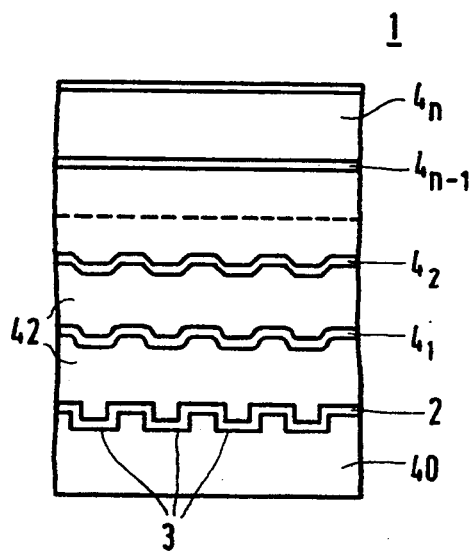
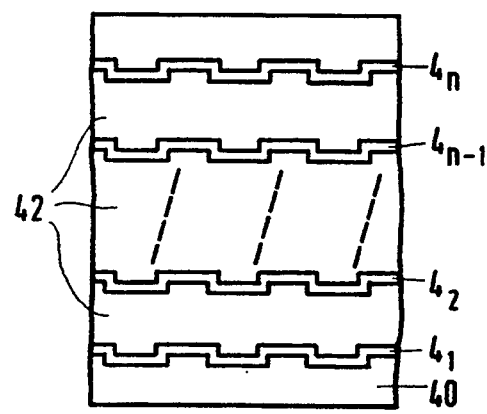
FIG.2a
FIG.2b
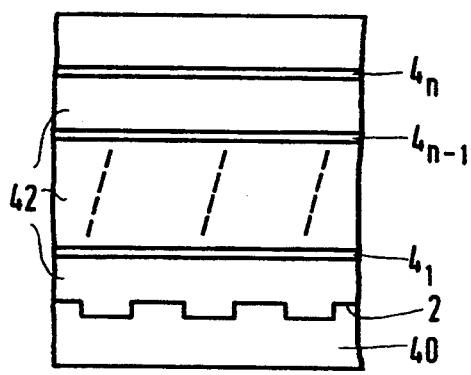
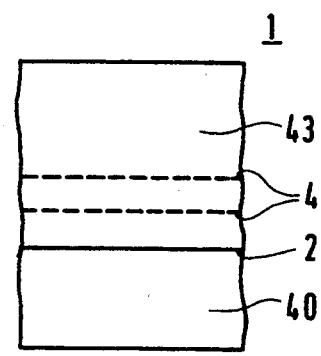
FIG.2c
FIG.3

METHOD OF AND APPARATUS FOR OPTICALLY WRITING, READING AND ERASING A MULTI-PLANE RECORD CARRIER, AND RECORD CARRIER SUITABLE FOR SAID METHOD AND APPARATUS

BACKGROUND OF THE INVENTION

The invention relates to a method of optically writing and subsequent reading and/or erasing information in a recording plane of an optical record carrier having at least two recording planes and a guide plane. A guide beam focused at a spot(guide focus) in the guide plane is used during writing, and at least one write beam focused to a writing spot(write focus) in the recording planes, the guide focus and the write focus being formed by one objective system and the guide focus being held in the guide plane by means of a focus error signal generated by the guide beam.

A method of the type mentioned in the opening paragraph is described in Japanese Patent Application 63-234418. In accordance with this method an objective system converges a guide beam to a guide focus on a guide plane in a record carrier. A focus servosystem controls the objective system in such a way that the guide focus remains in the guide plane in spite of possible excursions of the record carrier. A read or write beam, or generally a scanning beam, is focused by the objective system on a recording plane to be written or read, which plane is parallel to the guide plane. For this purpose the read/write focus of a read/write beam formed by said objective system must be displaceable with respect to the guide focus in the longitudinal direction, i.e. in the direction of the optical axis. Starting from a reference position of the scanning focus, which reference position is equal to the desired position of the guide focus, this is realised by displacing the radiation source supplying the scanning beam along the optical axis over discrete distances which match the distances between the recording planes.

To be able to use the known method with a so-called passive longitudinal adjustment of the scanning focus, the different recording planes of the record carrier must be very accurately parallel to the guide plane within the focus depth of the objective system, because otherwise the scanning focus is not always located in a ,recording plane to be scanned. A multilayer record carrier having such a high degree of parallelism of the layers is difficult to manufacture and is consequently expensive. Moreover, during writing, the scanning focus should accurately follow a given track in a recording plane to be scanned, while during reading the scanning focus should accurately follow the written information tracks. Said Japanese Patent Application 63-234418 does not reveal how this so-called transversal positioning of the scanning focus must be realised.

SUMMARY OF THE INVENTION

The present invention has for its object to provide a method and apparatus of the type described in the opening paragraph in which a record carrier which can easily be manufactured can be used and in which the transversal positioning problem is also solved.

In accordance with a first aspect of the invention the method is characterized in that during writing the transversal position of the write focus in a recording plane is coupled to the transversal position of the guide focus, the latter position being controlled by a tracking error signal obtained from the cooperation between the guide beam and the guide plane, and in that during reading and/or erasing:

a read focus formed by a read beam is held in the scanned recording plane by means of a focus error signal obtained from the cooperation between the read beam and the scanned recording plane, and the transversal position of the read focus is controlled by a tracking error signal obtained from the cooperation between the read beam and the scanned recording plane.

The invention is based on the recognition that the transversal position of the write focus can be controlled by coupling this position to that of the guide focus by means of guide information in only one plane of the record carrier when writing all recording layers, and that the read focus can be controlled independently of the guide focus when reading written recording layers.

The guide focus is held on a track in the guide plane by a tracking servo. During writing, when there are still no tracks in the recording plane, the write focus is coupled to the guide focus as regards the transversal position, i.e. the position in a direction perpendicular to the optical axis as well as to the tracks. During reading the guide focus is held on the written tracks by means of an active control in the transversal direction. The read focus is then also actively focused on the recording plane to be read.

It is to be noted that Japanese Patent Application 63-298836 describes a method using a guide beam and a write beam. However, each of these beams is focused by a separate objective system so that the coupling between the two beams cannot be realised with sufficient accuracy. Moreover, the latter Patent Application does not describe the writing and reading of record carders having various recording planes.

If the method according to the invention is further characterized in that the read beam used during reading or erasing is constituted by the guide beam, it can be implemented with a small number of means and the apparatus for performing the method can be simplified.

For writing a recording plane in a record carrier in which the recording planes are constituted by surfaces of separate recording layers which are separated by spacer layers, the method is preferably characterized in that the write focus is held in the recording plane by means of a focus error signal which is obtained from the cooperation of the write beam with the scanned recording plane. The write beam will then remain satisfactorily focused on the recording plane, even if the guide plane and the recording plane are not parallel within a focus depth.

For writing a recording plane in an unlaminated record carrier the method is preferably characterized in that the longitudinal position of the write focus is guided by the longitudinal position of the guide focus, the distance between the two positions being determined by the ordinal number of the recording plane to be written. Use of this method leads to a record carrier in which one or more recording planes are formed.

A second aspect of the invention relates to an apparatus for performing the method, which apparatus comprises at least one radiation source for supplying a guide beam and at least one write beam, an objective system for focusing the guide beam to a guide focus as well as for focusing the write beam to a write focus, and a first servosystem for longitudinally positioning the guide focus in the guide plane. Such an apparatus is known from said Japanese Patent Application 63-68207. The drawback of this apparatus is that the read/write beam does not have any independent servosystems for longitudinally and transversally positioning the read/write focus.

Another object of the invention is to provide an apparatus which does not have these drawbacks. This apparatus is characterized in that it comprises a second servosystem for transversally positioning the guide focus in the guide plane, a coupling of the control of the transversal position of the write focus to the second servosystem, a read tracking servosystem and a read focus servosystem for transversally and longitudinally positioning, respectively, a read focus formed by a read beam, said servosystems using a tracking error signal and a focus error signal, respectively, generated by means of the read beam. The second servosystem holds the guide beam on the tracks in the guide plane. During writing the transversal position of the write focus is coupled to that of the guide focus because there is no tracking information in an unwritten recording plane. During reading the read focus must be held on the tracks in the recording plane by its own tracking servosystem. A coupling of the transversal position of the read focus to that of the guide focus as used during writing cannot be used during reading because the transversal positioning of the write focus with respect to the guide focus during writing cannot be reproduced with sufficient accuracy during reading. For similar reasons the read beam must have its own focus servosystem. To this end an embodiment of the apparatus according to the invention for writing a record carrier in which the recording planes are constituted by surfaces of separate recording layers which are separated by spacer layers is characterized in that the apparatus comprises a third servosystem for longitudinally positioning the write focus in a recording plane, using a focus error signal which is supplied by the write beam. By virtue of the third servosystem the write focus remains in the recording plane, independent of the parallelism of the recording plane and the guide plane.

A further embodiment of the apparatus according to the invention for writing a recording plane in an unlaminated record carder is characterized in that the apparatus comprises a coupling of the control of the longitudinal position of the write focus to the first servosystem. In an unlaminated record carrier a recording plane is not formed until the information is written. Prior to writing, the recording plane is not present so that a write focus cannot be adjusted. For this reason the longitudinal position of the write focus must be coupled to the guide focus during writing.

An embodiment of the apparatus according to the invention may be further characterized in that the third and a fourth servosystem determine the longitudinal and transversal positions, respectively, of the read focus. Reading and writing can then be effected by means of the same radiation beam. In this case the apparatus requires only four servosystems for the guide, write and read beams.

A preferred embodiment of the apparatus according to the invention is characterized in that the first and second servosystems determine the longitudinal and transversal positions, respectively, of the read focus. The same radiation beam can now be used as a guide beam and as a read beam. The apparatus then only requires three servosystems.

To be able to separate the different radiation beams in the apparatus in order to detect them separately, the beams may have a different wavelength, a different state of polarization or a different spatial direction, or a combination thereof.

If the detection systems for the guide beam and read or write beam on the one hand and the radiation sources on the other hand are located at different sides of the record carder, the advantage is obtained that the power of a radiation beam to be detected is independent of the ordinal number of the scanned recording layer.

A third essential aspect of the invention is the possibility of detecting a recording plane having a desired ordinal number. When writing and reading a multilayer record carrier it is not sufficient for the scanning beam, or write/read beam, to be exactly focused on a recording plane, but it is at least as important that the correct, i.e. selected plane is focused. An apparatus providing this possibility is characterized by a recording plane selector which comprises a plane discriminator connected to the output of a focus error detection system of the scanning beam, a counter connected to said discriminator and a comparison circuit for comparing the counter contents with the ordinal number of a recording plane to be scanned.

The plane selection method used in this apparatus differs considerably from and is more reliable than that described in Japanese Patent Application 63-234418, which works with fixed longitudinal distances between the scanning focus and the guide focus.

The presence of the focus servosystem for the read focus is a previously mentioned aspect of the invention. The signal supplied by the focus error detection system comprises information about the presence of a recording plane on or near the scanning focus. When the scanning focus is moved through the recording planes, the plane discriminator can derive a pulse from the above-mentioned signal at any instant when a recording plane passes through the scanning focus. With reference to these pulses and the direction of movement of the scanning focus the counter determines the ordinal number of the recording plane passing the scanning focus. In this way it is possible to focus the scanning beam on any desired layer. The plane selection method according to the invention is applicable in all apparatuses for writing, reading or erasing multilayer optical record carriers which actively focus on the different recording planes in the record carrier.

A fourth aspect of the invention is the correction of optical aberrations in the scanning beam for the different longitudinal positions of the scanning focus in the record carrier. The thickness of the record carrier traversed by the scanning beam as far as the scanning focus is dependent on the ordinal number of the recording plane to be scanned. This variable thickness introduces a variable quantity of spherical aberration in the scanning beam, which spherical aberration detrimentally influences the shape of the scanning focus. In the case of thickness variations of more than approximately 100 $\mu m$ the scanning beam must be corrected so as to maintain a satisfactory quality of the scanning focus. To this end an apparatus in accordance with the fourth aspect of the invention is characterized in that the apparatus includes at least one spherical aberration corrector for an adjustable correction of spherical aberration in the scanning beam, the magnitude of the correction being dependent on the refractive index and the thickness of the material of the record carrier in the optical path of the scanning beam between the objective system and the scanned recording layer. A particular embodiment of such an apparatus is characterized in that the spherical aberration corrector having an adjustable connection is a transparent plate comprising a plurality of areas of different thicknesses, each time one of said areas being present in the path of the scanning beam. Plane-parallel plates of, for example, glass or plastics material can easily be used to correct the spherical aberration for any recording plane to be scanned.

It is to be noted that U.S. Pat. No. 3,999,009 also describes an apparatus for scanning a multilayer record carrier, which apparatus has a transparent plate which can be introduced into the scanning beam. This plate is intended to move the scanning focus longitudinally, with the objective system being stationary. In contrast to the plate according to the invention, the known plate does not correct the spherical aberration, but aggravates it. A further difference between the two plates is that the known plate should become thicker to move the scanning focus away from the objective system, and that the plate according to the invention should become thinner.

The spherical aberration corrector may be generally used in an apparatus for scanning multilayer record carriers, not only in an apparatus using a guide beam and a scanning beam, but also in an apparatus without a guide beam.

The method and apparatus according to the invention provide the possibility of using a novel type of record carder which cannot only be written in a well-defined manner but also be read satisfactorily. This record carrier therefore constitutes a fifth aspect of the invention and is characterized in that the record carrier has a recording layer of such a thickness that it can be provided with different recording planes which can be scanned separately. Such a thick recording layer can be made at a lower cost than a stack of recording layers and intermediate layers. The recording planes are not formed until the thick recording layer is written.

A preferred embodiment of the record carrier is characterized in that the guide plane has an inscribable layer. The number of recording planes in the recording layer is extended by one by providing the guide plane with a sensitive layer.

A further preferred embodiment of the record carrier is characterized in that the guide plane comprises non-erasable information which has been prerecorded during the production of the record carrier. The non-erasable information enhances the facilities of use of the record carrier and provides, for example, the possibility of distributing standard data or programs. The non-erasable information can be laid down in the guide plane simultaneously with the tracking information by means of a stamping process, as described in, for example GB Patent Application 2,036,410.

The information in the recording planes is preferably coded in accordance with a self-clocking recording code. Since the recording planes do not comprise any synchronizing marks provided during production, the clock for decoding the signal which has been read from the written information in the recording planes, must be generated by the apparatus itself from said signal.

Embodiments of the invention will now be described in greater detail by way of example with reference to the accompanying drawings.

BRIEF DESCRIPTION OF THE DRAWING

FIGS. 2a, 2b and 2c show embodiments of a record carrier having separate recording layers, FIG. 3 shows a record carrier having an unlaminated recording volume for use in the apparatus.

DESCRIPTION OF THE PREFERRED EMBODIMENT

Figure 1A:
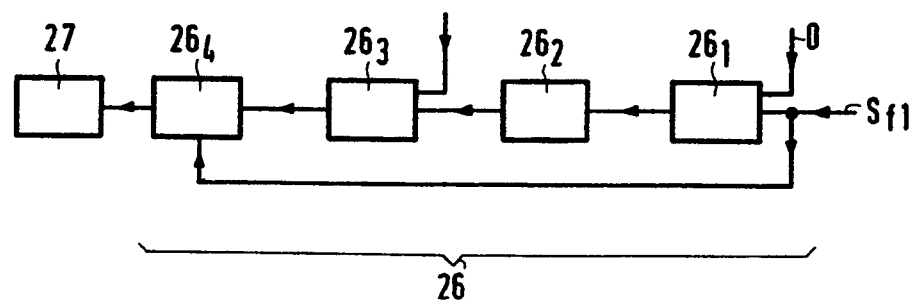
FIG. 1a shows an embodiment of a plane selector.
Figure 1B:
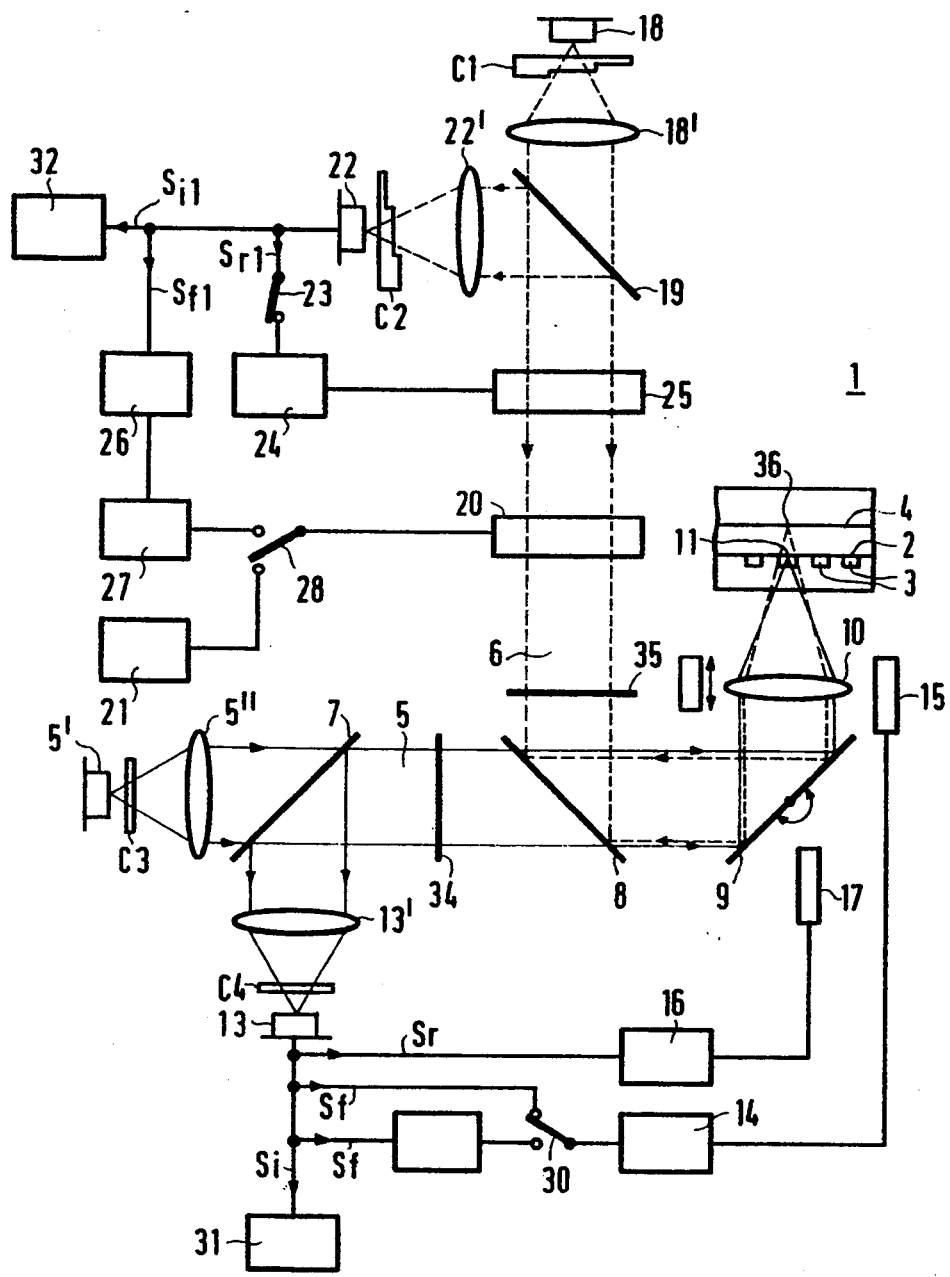
FIG. 1b shows an embodiment of the apparatus according to the invention.

FIG. 1b shows a part of an optical record carrier 1 in a cross-section. The record carrier has a reflecting surface defining a guide plane 2 provided with guide tracks 3 which are perpendicular to the plane of the drawing. These guide tracks are provided in the guide plane during the manufacture of the record carrier and may consist of, for example, continuous grooves or of series of pits in the guide plane. The record carrier also comprises various recording planes 4 one of which is shown in the drawing, intended for recording (user) dam. The guide tracks of the guide plane are not copied in the recording planes.

The apparatus for writing and reading information, for example, data in this record carrier uses two radiation beams, a guide beam 5 and a scanning beam 6. The guide beam 5 is shown in the drawing by means of solid lines and the scanning beam 6 is shown by means of broken lines. In parts of the optical path where the two beams may coincide, the solid line and the broken line are shown juxtaposed, just to indicate that there are two beams.

The guide beam is generated by a radiation source 5' arranged in the focus of a lens 5" and passes to an objective system 10 via a mirror 9. This system focuses the guide beam on the guide plane 2 of the record carrier. In order to keep the guide focus 11 of the guide beam in the guide plane when the record carrier is moving, the longitudinal position of the focus, i.e. the position along the principal axis of the beam, must be actively controlled. To this end radiation reflected by the guide plane and captured by the objective system is passed from the guide beam to a first detection system 13 via a beam-separating element 7, for example, a partially transparent mirror, and a lens 13'. The output of this system supplies a focus error signal Sf, i.e. a signal which is representative of the distance between the guide plane and the plane in which the guide beam is focused by the objective system. The focus error signal controls a linear motor 15 via a switch 30 and a first servo amplifier 14, which motor determines the longitudinal position of the objective system 10 and hence that of the guide focus 11. The detection system 13, the amplifier 14, the motor 15 and the objective system 10 jointly constitute the first servosystem of the apparatus. This first servosystem ensures that the guide beam 5 is always exactly focused on the guide plane 2. This is necessary to ensure optimum detection in the guide information present in this plane so that, inter alia, the guide focus 11 always follows a desired track 3 in the guide plane.

This tracking is possible because the detection system 13, which captures the guide beam radiation reflected by the guide plane, also supplies a so-called tracking error signal Sr. This signal is representative of the extent to which the centre of the guide focus coincides with the centre line of a track to be followed in the guide plane. The signal Sr controls a pivot-drive member 17 for the pivotal mirror 9 via a servo amplifier 16. By pivoting this mirror about an axis perpendicular to the plane of the drawing, the guide focus can be displaced in the transversal direction, i.e. in a direction in the guide plane and transverse to the track direction. The detection system 13, the amplifier 16 and the drive member 17 with the mirror 9 constitute a second servosystem.

The scanning beam is generated by a second radiation source 18 arranged in the focus of a lens 18'. This beam is coupled by a reflecting element 19 to a coupling element 8, for example, a partially transparent mirror or a wavelength-selective mirror in the path of the guide beam 5. Via the reflector 9 this beam reaches the objective system 10 which forms a scanning focus 36. This scanning focus must always be positioned accurately, both in the longitudinal direction (parallel to the beam axis) with respect to a recording layer 4 to be scanned, and in the transversal direction in this layer.

As regards the tracking information or, more in general, the guide information, a record carrier having different recording layers may in principle be implemented in different ways. FIG. 2a shows a record carrier having a guide plane 2 which can be supported by a substrate 40. The guide plane comprises guide tracks 3 in the form of continuous grooves or consisting of discrete pits having a depth of the order of 60 nm. The recording layers $4_1$ to $4_n$ are preferably 10 to 100 nm thick and are separated by means of spacer layers 42. If these spacer layers are considerably thinner than 1 $\mu$m, the contours of the guide tracks 3, which in principle are only provided in the guide plane, will also be present in the first recording layer $4_1$, the second recording layer $4_2$, and so forth, but with a strongly decreasing depth and will therefore be less suitable for tracking. Said contours are not present in the higher information layers.

Another possibility is to provide each recording layer separately with guide information, as is shown in FIG. 2b. However, for each recording layer a replication process must be performed with the aid of a stamp, which renders the manufacture of the record carrier very expensive.

According to the invention use is made of a record carrier shown in FIG. 2a whose guide plane only is provided with guide information. When information is being written in a recording layer, use is made of this guide information which is detected and followed with the guide beam.

As already indicated hereinbefore and shown in FIG. 1b, this is realised in that the write beam is coupled into the path of the guide beam so that the write beam is passed via the pivotal mirror 9 for guiding in the transversal direction simultaneously with the guide beam. In principle, the write focus then follows the same track as the guide focus except for being offset longitudinally, while the second servosystem (13, 16, 17, 9) enables the guide focus to follow the guide tracks 3 very accurately, for example, within 100 nm.

This passive transversal control of the scanning focus is satisfactorily usable during the writing operation because in this operation it is only important for the write focus to follow the same or similar track as the guide focus. It is then unnecessary for the write focus track projected in the guide plane to coincide exactly with that of the guide focus. This would be different if a recording plane which has already been written were read by means of a read focus whose tranversal position would be coupled to that of the guide focus in the manner described hereinbefore. In this coupling the mutual position of the scanning focus and the guide focus are determined by the mutual position of the two radiation sources 5' and 18 and by the position of the beam splitters 7, 8 and 19. If the optical system between the radiation source and the focus has a magnification factor of, for example 5, the mutual distance between the radiation sources should be kept constant within, for example, 500 nm so as to follow the tracks in the recording plane within 100 nm. Due to mechanical instabilities and thermal effects, such tolerances are very difficult to realise in an apparatus.

If a record carrier is to be written with a first apparatus and read with a corresponding second apparatus, the reading operation by means of a read beam and a guide beam poses the additional problem that the deviation between the positions of the guide focus and the read focus in one apparatus is different from that in the other apparatus.

To prevent said stringent tolerance requirements and problems, the transversal position of the scanning focus is actively controlled according to the invention during the reading operation by means of read beam radiation reflected by a scanned recording plane. This radiation follows the path of the read beam in the reverse direction and is captured by a detection system 22 via the partially transparent element 19 and a lens 22'. The transversal control of the read focus is performed by a third servosystem comprising the detection system 22, a first switch 23, a servo amplifier 24 and a transversal shifter 25. The detection system 22 supplies a tracking error signal $S_{r1}$ which represents the transversal distance between the scanning focus and the centre of a track in a recording plane. When a recording plane 4 is being written, the switch 23 is open and there is no active control for the tracking of the scanning focus. During reading the switch is closed and the tracking error signal $S_{r1}$ is passed on to the amplifier 24 which in its turn applies the amplified signal to the transversal shifter 25. The shifter is an optical element which can change the direction of the scanning beam through a small angle. The objective system converts this change of direction into a change of the transversal position of the scanning focus. The tracking control of this third servosystem may be superimposed on the control of the second servosystem which operates via mirror 9.

However, it is preferable to switch off the second servosystem during reading and to cause the servo amplifier 24 to control the mirror 9 instead of the transversal shifter 25. The latter is then superfluous.

If the recording layers have a thickness of 300 to 500 nm and the spacer layers have a thickness of 0.5 to 1 $\mu$m, as proposed in Japanese Patent Application 63-234 418, there is the problem that if the scanning beam is focused on one of the recording planes, a relatively small radiation spot is formed at the area of the adjacent recording planes due to the not infinitely small depth of focus of the beam. The depth of focus of a beam having a numerical aperture of 0.52 and a wavelength of 0.82 $\mu$m is $\pm 1.5$ $\mu$m, which means that the intensity on the optical axis, at a point 1.5 μm away from the focal point, is still a factor of 0.8 times that in the focal point. When a recording plane is being written, an adjacent plane at a distance of 1 μm will also be written, while the adjacent planes will produce strong interference signals when a recording plane is being read.

This problem could be solved by rendering the recording layers wavelength-selective and by placing a separate radiation source in the apparatus for each layer. Then a scanning beam for a given recording plane will not influence other recording planes or will not be influenced. A drawback of this solution is the limited choice of materials for the recording planes and of radiation sources having different wavelengths. This considerably limits the possible number of recording planes in the record carrier.

A better method is to render the thickness of the spacer layers 42 considerably larger than the depth of focus of the beam. However, this requires a production method which is different from that used for thin layers. Layers up to a thickness of 1 μm can be made by sputtering or vapour deposition. However, these processes are too time-consuming for thicker layers. Spin-coating is better for this purpose. The current technology does not provide the possibility of maintaining the thickness variation of spin-coated layers well within 1 μm.

Due to these thickness variations a passive longitudinal control of the scanning focus, as proposed in Japanese Patent Application 63-1298836, can no longer be used. In fact, in this control the scanning focus is longitudinally placed at discrete distances from the guide focus, which distances are determined by the ordinal number of the recording layer to be scanned. In this case the distances between the guide plane 2 and the recording planes 4, and hence the thickness of the spacer layers 42 are assumed to be very accurately constant. If the variation of the thickness of the spacer layer is larger than the depth of focus of the scanning beam, the scanning focus will not always be located in the recording plane to be scanned, even if the guide focus is located in the guide plane.

According to the present invention this problem is solved by actively controlling the scanning focus during writing as well as during reading. Use is then made again of scanning beam radiation reflected by the recording layer to be scanned, which radiation is captured by the detection system 22. This system supplies a focus error signal $S_{f1}$ which comprises information about a deviation between the longitudinal position of the scanning focus and the recording plane to be scanned. The active longitudinal control of the scanning focus is performed by means of a fourth servosystem comprising the detection system 22, a recording plane selector 26, a servo amplifier 27, a second switch 28 and a longitudinal shifter 20. The recording plane selector 26 in FIG. 1a comprises a plane discriminator $26_1$ which supplies a pulse for each passage of the scanning focus through a recording plane. Use can then be made of, for example, the focus error signal which has a zero crossing at each recording plane and guide plane. If the scanning focus scans the layer packet of the record carrier, the plane discriminator will supply a pulse upon the passage of each recording plane. A counter $26_2$ counts the pulses, while the direction of movement of the scanning focus with respect to the recording planes determines whether additions or subtractions must be carded out. The output of counter $26_2$ is connected to a first input of a comparison circuit $26_3$, while the ordinal number of the selected recording layer is applied to a second input. At the instant when the desired recording plane passes, the focus error signal $S_{f1}$ is passed on to the servo amplifier 27 via a switch $26_4$ which is operated by the comparison circuit $26_3$. The output signal of this amplifier is applied to the longitudinal shifter 20 via a closed switch 28, so that the scanning focus is made to coincide with the selected recording plane. The focus control of this fourth servosystem is superimposed on the control of the first servosystem operating via objective 10. It is now possible to actively keep both the guide focus and the scanning focus in the correct plane.

When a focused beam passes through a plate of transparent material, the plate will generate a quantity of spherical aberration in the beam, proportional to the thickness of the plate. The spherical aberration has a detrimental influence on the quality of the beam focus. The scanning focus 36 can be positioned on different layers in the record carrier 1. When the scanning focus is longitudinally shifted through the record carrier, the thickness of the record carrier material to be scanned between the objective system 10 and the scanning focus 36 will change. As a result, the quantity of spherical aberration at the location of the scanning focus changes. Apparatuses comprising an objective system 10 having a numerical aperture of 0.52 can generally allow a thickness variation of +or −50 μm without the scanning focus becoming too bad. In other words, the scanning focus has a depth range of 100 μm. If the recording planes have a mutual distance of approximately 15 μm, i.e. several times the depth of focus of the objective system, only a few recording planes can be provided in a thickness of 100 μm. If more of such recording planes are to be provided in a record carrier, the scanning focus will have to shift more than 100 μm. Then a corrector will be required to correct the generated spherical aberration in the scanning beam. A correction for every 50 or 100 μm of longitudinal displacement of the scanning focus is generally sufficient.

A simple corrector comprises a plate of glass or synthetic material which can be placed in an uncollimated part of the scanning beam. The thickness and refractive index of the plate should be such that the quantity of spherical aberration in the scanning beam required for the correction is generated. The thickness and refractive index are dependent on the vergence of the scanning beam at the area of the plate and at the area of the record carrier.

A correction for spherical aberration in the apparatus of FIG. 1b can be performed by placing two correctors in the guide beam as well as in the scanning beam. A corrector C1, for example, a plate having areas of different thicknesses is arranged in the scanning beam 6 between the radiation source 18 and the collimator lens 18′. The scanning beam can scan any of these areas by displacing the corrector. If the thinnest part of the corrector is present in the scanning beam and the scanning focus 36 is positioned on the recording layer 4 which is farthest remote from the objective system 10, the scanning focus should be substantially free from spherical aberration. This should be realised with a special lens design of the objective system. If the scanning focus is positioned on a recording layer closer to the objective system, a thicker part of the corrector C1 must be positioned in the scanning beam so as to obtain the desired correction of the spherical aberration. If it is necessary to have a minimum aberration at the area of the detection system 22, a second corrector C2, which is comparable to corrector C1, should also be arranged between said detection system and the lens 22′. The correctors C1 and C2 should always generate an equal quantity of spherical aberration in the scanning beam. A third corrector C3 between the radiation source 5′ and the collimator lens 5″ should ensure that, after passage through the objective system having said special design, the guide beam 5 supplies a scanning focus 11 on the guide plane 2, which focus is free from aberrations. The same corrector C4 can be arranged in front of the detection system 13 for the same reason as the corrector C2 is arranged in front of the detection system 22. The correctors C3 and C4 can be integrated with the lens 5″ and the lens 13′, respectively, by giving these lenses a modified design. The spherical aberration generated by the correctors C 1 and C3 in the scanning and guide beams causes the beams to flare out between the correctors and the objective system. The detrimental effects can be mitigated by shortening the optical paths of the guide and scanning beams as much as possible.

The correctors C1 and C2 may alternatively comprise a plurality of plates each having a constant thickness, one or more of which may be present in the scanning beam.

Figure 4A:
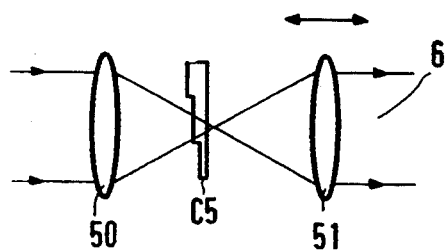
FIGS. 4a and 4b show embodiments of a longitudinal shifter.

An advantageous embodiment of the apparatus has only one corrector C5 in the longitudinal shifter 20 to be described, instead of the two correctors C1 and C2 arranged in front of the radiation source 18 and the detection system 22. As is shown in FIG. 4a, the construction of the corrector C5 can be compared with that of the corrector C1.

A further simplification is obtained if the guide plane 2 in the record carrier 1 is not the plane located closest to the objective system 10, as is shown in FIG. 1b, but if it is the farthest remote plane. The correctors C3 and C4 can then be dispensed with.

In a special embodiment the scanning apparatus using a guide beam and a scanning beam has only one corrector which is arranged between the objective lens 10 and the record carrier 1. The corrector influences the two beams at this location. The guide focus is then allowed to receive a certain quantity of spherical aberration from the corrector. This corrector increases the depth range of the scanning focus without correction at least by a factor of two.

In a multilayer plate scanning apparatus without a guide beam the aberration correction can also be performed by one adjustable corrector which is arranged between the objective lens and the record carrier.

The user data may be written in any form in the apparatus, dependent on the type of sensitive material in the recording plane: in the form of magnetic domains, in alloy phase-varied areas, hi crystallisation state-varied areas, etc. The data in the recording planes can be read by means of the detection system 22 in the reflected scanning beam, which supplies an information signal $S_{i1}$ which is applied to a processing unit 32. As long as the detection system can read the data in a recording plane, there is certainly a signal which is strong enough to generate a tracking error and focus error signal for the control of the servosystems of the scanning beam. A reflection coefficient of a few percent of a recording plane is found to be sufficient already.

When reading information, a clock signal for correctly decoding the read signal must be generated in the processing unit 32. Each recording plane could be provided with synchronization marks from which the clock signal can be derived. However, if this is done during manufacture, an expensive stamping or replica from process is required for each recording layer. The record carrier therefore preferably comprises spin-coated layers without any synchronization marks stamped into them. In such a record carrier the clock signal must be generated from the information written into the recording planes. It is therefore recommended to write the data into the recording layer with a self-clocking code. The processing unit itself can then derive the clock signal from the information signal $S_{i1}$. An example of such a code is the (2,7) recording code known from U.S. Pat. No. 3,689,899.

A novel embodiment of a record carrier which can be used in the apparatus described is shown in FIG. 3. The single recording layer 43 has such a thickness that various recording planes 4 can be written into it. FIG. 3 shows two recording planes. Before writing, the recording plane is still undefined. Therefore, the scanning focus with which the plane is written should not only be coupled to the guide focus in the transversal direction but also in the longitudinal direction, which guide focus follows the traces in the guide plane 2. During writing the switch 23 is open and the longitudinal position of the write focus is determined by an adjusting member 21 which is then connected to the longitudinal shifter 20 via the switch 28. This adjusting member supplies a signal which may have a number of discrete levels each corresponding to a given longitudinal position of the write focus in the recording layer 43 of the record carrier shown in FIG. 3. After a given plane 4 of this record carrier has been written, it may serve as a plane for the active focus control. The switch 28 is then in a position in which the output of the servo amplifier 27 is connected to the longitudinal shifter 20. This control is used when reading a written layer 4, while switch 23 is closed.

In a further embodiment of the record carrier the guide plane can also be provided with a sensitive layer so that this plane can also be provided with user data, thus increasing the storage capacity of the record carrier.

If various users want to have a quantity of data available which is the same for all of them (standard data) in addition to their own specific data, the manufacturer can prerecord this standard data on the record carrier, preferably in the guide plane.

Figure 4B:
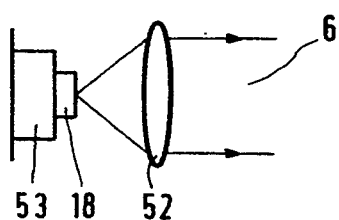

Some aspects of the apparatus will be further described. FIGS. 4a, 4b, 4c and 4d show several embodiments of the shifters 20 and 25. The longitudinal shifter of FIG. 4a has two lenses 50 and 51 producing an approximately collimated beam 6 from the radiation emitted by the source 18. The vergence of the outgoing beams can be slightly changed by a small displacement of lens 51 along the optical axis. As a result, the focus formed by the objective 10 is displaced in the longitudinal direction. When using a focus motor, which is used in a known CD player for displacing lens 51, the scanning focus 36 can be positioned on a different recording layer within a few milliseconds. The plate C5 can be arranged between the lenses 50 and 51 for correcting spherical aberration. Another embodiment of a longitudinal shifter, known from Japanese Patent Application 63-234418 is shown in FIG. 4b. The radiation from the source 18 is formed to an approximately collimated beam 6 by a collimator lens 52. The source 18 is arranged on a piezoelectric crystal 53. The laser can be displaced along the optical axis over a small distance by means of a voltage across the crystal. The vergence of the outgoing beam can thereby be varied.

Figure 4C:
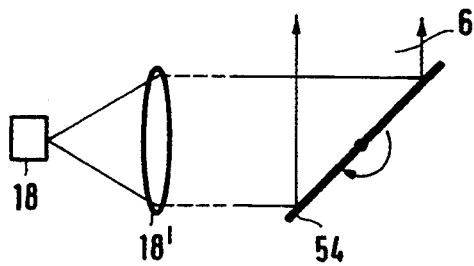
FIGS. 4c and 4d show embodiments of a transversal shifter.
Figure 4D:
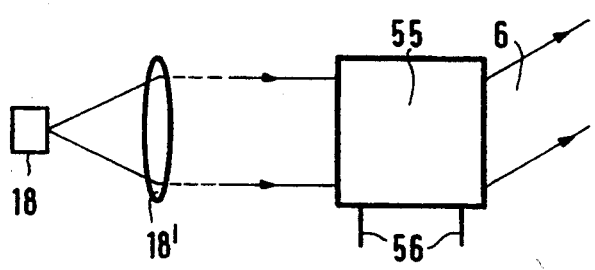

The transversal shifter of FIG. 4c comprises a folding mirror 54 which is arranged in the scanning beam 6. A rotation of the mirror changes the direction of the beam 6, which change of direction is converted by the objective into a transversal shift of the scanning focus 36. The sub-plate 19 can be used as a folding mirror if the radiation source 18 and the detection plane 22 are interchanged. The direction of the beam 6 can also be changed by means of an acousto-optical modulator 55, as is shown in FIG. 4d. The change of direction of the outgoing beam 6 is dependent on the control voltage 56 which is applied to the modulator.

The apparatus according to the invention may alternatively be formed without the transversal shifter. Instead of a separate scanning beam 6, guide beam 5 is then used for reading the recording planes. During writing the scanning beam is used together with the guide beam, while an active transversal control of the scanning beam is not necessary.

For a satisfactory operation of the apparatus it is desirable to calibrate the longitudinal and transversal shifters 20 and 25. When an unlaminated record carrier is being written, the longitudinal position of the write focus is determined by the adjusting member 21 and the longitudinal shifter 20. The inevitable variation of parameters in these components necessitates a calibration if the components are used in a non-feedback system. For the purpose of calibration the guide focus is positioned in the guide plane by means of the lens 10. Subsequently, the adjusting member 21 is adjusted in such a way that the write focus is also located in the guide plane. This can be checked by comparing the information in the signal $S_{i1}$ of the detector 22 and in the signal $S_i$ of the detector 13. Based on this calibrated adjustment, the longitudinal position of the write focus can now be changed in small steps for writing the different recording planes.

A comparable calibration of the transversal shifter 25 is to be recommended before writing in a recording plane. This is particularly desirable if the same recording plane is further to be written behind a previously written area in this recording plane. It is most likely that the transversal distance between the guide focus and the write focus at the start of the second writing action will no longer be the same as at the end of the previous writing action, which is due to adjustment variations in the apparatus. This presents the risk that the tracks to be written pass through the last-written tracks of the previous writing action. This can be avoided by means of a calibration. To this end the guide focus and the write focus are positioned in the guide plane, as described hereinbefore. Subsequently, the transversal shifter 25 is adjusted by means of an adjusting member (not shown in FIG. 1) so that the write focus is on the same track as the guide focus. This can be checked by comparing the information signals $S_i$ and $S_{i1}$ of the guide beam 5 and the beam 6, respectively. Subsequently the write focus can be moved to a recording plane to be written while maintaining the adjustment of the transversal shifter.

Figure 5:
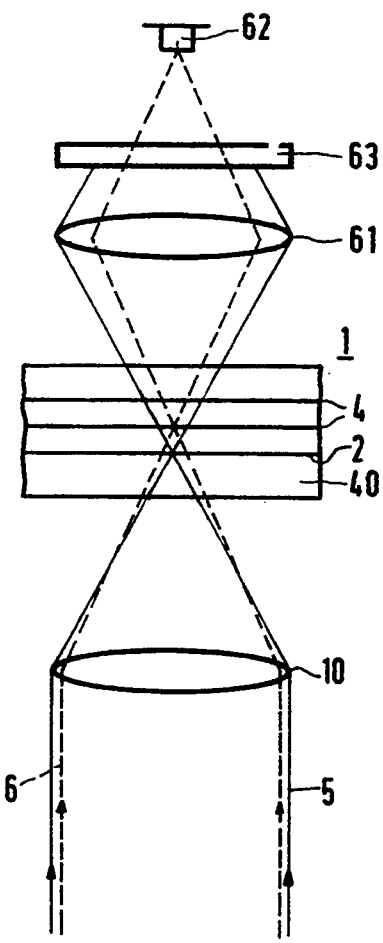
FIG. 5 shows a part of an embodiment of the apparatus for reading in transmission.

FIG. 5 shows a part of an embodiment of the apparatus in which the record carrier is read in transmission. The scanning beam 6, shown in broken lines in the drawing, now scans all layers of the record carrier 1 so that the power of the beam to be detected is independent of the recording plane on which the scanning focus is positioned. A lens 61 focuses the beam which has passed the record carrier on a detector 62, which then supplies the information signal $S_{i1}$. If the scanning beam 6 as well as the guide beam 5 are present during reading, a filter 63 is used which passes only one of the beams to the detector 62 so as to avoid disturbance of the information signal.

Such a separation between the scanning beam and the guide beam is also necessary elsewhere in the apparatus to ensure that the detection systems 13 and 22 in FIG. 1b only receive radiation from the beams 5 and 6, respectively. To this end two filters 34 and 35 are arranged around beam splitter 8. The properties of the filters depend on the way of beam separation. When radiation sources of different wavelengths are used, 34 and 35 will be chromatic filters. When different states of polarization of beams 5 and 6 are used, 34 and 35 will be polarization filters. Such filters can be satisfactorily combined to a single element with the beam splitter 8 in the form of a cube on which chromatic filters have been vapour-deposited or a cube having a polarization-sensitive splitting plane. If the beams 5 and 6 are given a slightly different direction, 34 and 35 are spatial filters. Such a filter may consist of a telescopic system having a pinhole in the focal point, or of pinholes for the detection systems 13 and 22. Combinations of the above-mentioned three beam-separating methods are alternatively possible. If the separation of the beams reflected by the record carrier and the beams emitted by the radiation sources must be accompanied by a minimal amount of radiation loss, the beam splitter 8 may be replaced by a polarizing beam spitter and a λ/4 plate.

The detection systems 13 and 22 for generating a focus error signal $S_f$, $S_{f1}$, tracking error signals $S_r$, $S_{r1}$ and information signals $S_i$, $S_{i1}$ are only shown diagrammatically in FIG. 1b. Actually, a focus error detection system may include an astigmatic element, for example a cylindrical lens which is arranged in the path of the reflected beam, and the radiation-sensitive detection system may comprise four detection elements arranged in different quadrants. The so-called astigmatic focus error detection method as described in U.S. Pat. No. 4,023,033 is then used. The focus error signal may alternatively be obtained by means of the so-called double Foucault method in which a roof prism is arranged in the reflected beam and in which four aligned detection elements are used. The Foucault method is described in, for example, U.S. Pat. No. 4,533,826. Instead of a prism, it is alternatively possible to use a grating as described in U.S. Pat. No. 4,665,310.

The system for generating a tracking error signal may comprise a grating in the path of the beam for forming three radiation spots on the record carrier, and three radiation-sensitive elements for capturing radiation from these three radiation spots, as described in U.S. Pat. No. 3,876,842. Another method of generating a tracking error signal is the so-called differential or push-pull method described in U.S. Pat. No. 4,491,940.

The invention has been described with reference to the embodiment of the apparatus as shown in FIG. 1b, in which the scanning beam is successively used as a write beam and as a read beam. Consequently, the apparatus must have four servosystems: a focus and tracking servosystem for the guide beam and a focus and tracking servosystem for the scanning beam. In a preferred embodiment the scanning beam is used as a write beam only, while the guide beam is also used as a read beam. Since no active tracking control is required for the write beam during the writing process, three servosystems may be sufficient in this apparatus: a focus and tracking system for the guide beam and a focus servosystem for the scanning beam. In this preferred embodiment it must be possible for the guide beam to be adjusted on any desired recording plane. To this end the focus servo should include a recording plane selector 29, identical to the selector 26 described hereinbefore, which can be switched on by means of switch 30 for a reading action. It is also possible to focus the guide beam on the guide plane by means of the recording plane selector 29. The switch 30 can then be dispensed with.

It is of course possible to use various scanning beams, each with their own servosystems, in addition to one guide beam in an apparatus. It is then possible to write, read or erase two or more layers simultaneously in accordance with the inventive method. This increases the rate of data transmission.

We claim:

1. A method of optically writing and subsequently reading information in a selected recording plane of an optical record carrier having at least two recording planes substantially parallel to each other and spaced from each other in a longitudinal direction substantially perpendicular to said planes, characterized by comprising:

providing said optical record carrier with a guide plane parallel to and spaced from said recording planes, said guide plane having markings formed therein defining a track, and during writing said method comprises the steps of:

producing a guide beam and focusing said guide beam to a guide spot in said guide plane determined partly by a common objective system, producing a write beam and, simultaneously with said focusing said guide beam, focusing said write beam to a write spot in said selected recording plane, said focusing of said write beam being determined partly by said common objective system, generating a first focus error signal responsive to the position of said guide spot in said longitudinal direction, for controlling focusing of the guide beam, generating a first tracking error signal, responsive to radiation of a part of said guide beam from said guide plane, providing a common adjusting element which is controllable to affect the transverse position of said guide spot with respect to said track, controlling the transverse position of said guide spot with respect to said track responsive to said first tracking error signal, by controlling said common adjusting element, and causing the transverse position of the write spot with respect to said track to be responsive to said common adjusting element, thereby coupling the transverse position of the write spot in said selected recording plane to said transverse position of said guide spot, and during reading and/or erasing, said method comprises the steps of:

producing a read beam and focusing said read beam to a read spot in said selected recording plane determined partly by said common objective system, generating a second focus error signal responsive to the position of said read spot in said longitudinal direction, for controlling focusing of the read beam, generating a second tracking error signal, responsive to radiation of a part of said read beam from said read plane, and controlling the transverse position of said read spot responsive to said second tracking error signal, at least partly by controlling said common adjusting element.

2. A method as claimed in claim 1, characterized in that the read beam used during reading or erasing is constituted by the guide beam.

3. A method as claimed in claim 1 for writing, reading and/or erasing a record carrier in which the recording planes are constituted by surfaces of separate recording layers which are separated by spacer layers, characterized in that during writing in a recording plane the write spot is held in the recording plane by means of a focus error signal which is obtained from the cooperation of the write beam with the selected recording plane.

4. A method as claimed in claim 1 for writing, reading and/or erasing an unlaminated record carrier in which various recording planes can be written, characterized in that during writing the longitudinal position of the write focus is guided by the longitudinal position of the guide focus, the distance between the two positions being determined by the ordinal number of the recording plane to be written.

5. A method as claimed in claim 1, characterized in that the steps of producing and focusing said write beam and said read beam are performed by a same scanning beam source and optical elements along a same scanning beam path.

6. A method as claimed in claim 1, characterized in that the method comprises:

identifying each recording plane with an ordinal number, and during writing, the longitudinal position of the write spot is guided by the longitudinal position of the guide spot, a predetermined distance between said positions being determined by the ordinal number of the plane to be written.

7. An apparatus for optically writing and subsequently reading information in a selected recording plane of an optical record carrier having at least two recording planes and a guide plane substantially parallel to each other and spaced from each other in a longitudinal direction substantially perpendicular to said planes, wherein said guide plane has a track formed therein, comprising:

means, including a common objective system, for producing a write beam and focusing said write beam to a write spot in said selected recording plane, characterized in that the apparatus further comprises:

means, including said common objective system, for producing a guide beam and, simultaneously with said focusing said write beam, focusing said guide beam to a guide spot in said guide plane, means for generating a first focus error signal responsive to the position of said guide spot in said longitudinal direction, for controlling focusing of the guide beam, means for generating a first tracking error signal, responsive to radiation of a part of said guide beam from said guide plane, a common adjusting element which is controllable to affect the transverse position of said guide spot, means, operable when said apparatus is in a write mode, and responsive to said first tracking error signal, for controlling said common adjusting element to move the transverse position of said guide spot toward a given transverse position with respect to said track, and means for causing the position of the write spot to be responsive to said controlling said common adjusting element, thereby coupling the transverse position of the write spot in said selected recording plane to said transverse position of said guide spot, means, including said common objective system, for producing a read beam and focusing said read beam to a read spot in said selected recording plane, means for generating a second focus error signal responsive to the position of said read spot in said longitudinal direction, for controlling focusing of the read beam, means for generating a second tracking error signal, responsive to radiation of a part of said read beam from said read plane, and means, operable when said apparatus is in a read model including said common adjusting element, for controlling the transverse position of said read spot responsive to said second tracking error signal.

8. An apparatus as claimed in claim 7 for writing, reading and/or erasing a record carrier in which the recording planes are constituted by surfaces of separate recording layer which are separated by spacer layers, characterized in that the apparatus comprises a third servosystem for longitudinally positioning the write spot in a recording plane, using a spot error signal which is supplied by the write beam.

9. An apparatus as claimed in claim 8, characterized in that the third and a fourth servosystem determine the longitudinal and transversal positions, respectively, of the read spot.

10. An apparatus as claimed in claim 7 for writing, reading and/or erasing an unlaminated record carrier, characterized in that the apparatus comprises a coupling of the control of the longitudinal position of the write spot to the longitudinal position of the guide spot.

11. An apparatus as claimed in claim 7, characterized in that the guide beam has a wavelength which is different from that of the read or write beam and in that the apparatus comprises wavelength-dependent beam-separating and combining means.

12. An apparatus as claimed in claim 7, characterized in that the guide beam has a state of polarization which is different from that of the read or write beam and in that the apparatus comprises polarization-dependent beam,separating and combining means.

13. An apparatus as claimed in claim 7, characterized in that the guide beam has a spatial direction which is different from that of the read or write beam and in that the apparatus comprises direction-dependent beam-separating and combining means.

14. An apparatus as claimed in claim 7, characterized in that the detection systems for the guide beam and the read or write beam and the radiation source are located at different sides of the record carrier.

15. An apparatus as claimed in claim 7, characterized in that said means for producing and focusing said write beam and said read beam include a same scanning beam source and at least a same group of optical elements along a scanning beam path.

16. An apparatus as claimed in claim 7, characterized in that said means for focusing the guide beam and the means for focusing the read beam are formed by a same first servomechanism, and said means for controlling the transverse position of said read spot is formed by said means for controlling the position of the common adjusting element.

17. An apparatus as claimed in claim 7, characterized in that the apparatus comprises means for identifying each recording plane with an ordinal number, a plane discriminator connected to an output of said means for generating a first focus error signal, a counter connected to said discriminator, and a comparison circuit for comparing the counter contents with a selected ordinal number of a recording plane to be scanned.

18. An apparatus as claimed in claim 17, comprising focus control means for causing the longitudinal position of the write spot to be guided by the longitudinal position of the guide spot, a predetermined distance between said positions being determined by the ordinal number of the plane to be written.

19. A record carrier for use in an apparatus for optically writing and subsequent reading information in a selected one of a plurality of recording planes, said apparatus providing a guide beam and write beam separate from, and simultaneously focusable at a different longitudinal position from, said guide beam for recording information, and means for guiding the transverse position of the write beam responsive to the transverse position of the guide beam, said record carrier comprising at least one layer of material for recording information therein in a plurality of recording planes which are substantially parallel to and spaced from each other, characterized in that said record carrier further comprises means for defining a single guide plane only, said guide plane is substantially parallel to and spaced from all recording planes in said record carrier including said recording planes, and has track guide information formed therein, and prior to recording of information in at least one of said recording planes, said at least one of said recording planes is free from guide information.

20. A record carrier as claimed in claim 19, characterized in that said recording layer includes a portion defined by a guide plane having an inscribable layer.

21. A record carrier claimed in claim 19, characterized in that said recording layer has a portion forming a guide plane having non-erasable information prerecorded thereon.

22. A record carrier as claimed in claim 19, comprising information coded in said recording plane with a self-clocking recording code.

23. A carrier as claimed in claim 19, characterized in that said at least one layer is formed by a plurality of layers of recording material, and a plurality of layers of spacer material between said layers of recording material.

24. A carrier as claimed in claim 19, comprising a substrate, and characterized in that said at least one layer is a single layer only having said recording planes within said layer, and having said guide plane formed adjoining said substrate.

25. A record carrier as claimed in claim 19, characterized in that said means for defining a guide plane is free from material for recording information therein.

26. A record carrier as claimed in claim 25, characterized in that prior to recording of information in any of said recording planes, all of said recording planes are free from guide information.

27. An apparatus for optically writing and subsequently reading information in a selected recording plane of an optical record carrier having at least two recording planes and a guide plane substantially parallel to each other and spaced from each other in a longitudinal direction substantially perpendicular to said planes, wherein said guide plane has a track formed therein, comprising:
  means, including a common objective system, for producing a scanning beam and focusing said scanning beam to a scan spot in said selected recording plane,
  characterized in that the apparatus further comprises:
    means, including said common objective system, for producing a guide beam and, simultaneously with said focusing said scanning beam, focusing said guide beam to a guide spot in said guide plane,
    means for generating a first focus error signal responsive to the position of said guide spot in said longitudinal direction, for controlling focusing of the guide beam,
    means for generating a first tracking error signal, responsive to radiation of a part of said guide beam from said guide plane,
    a common adjusting element which is controllable to affect the transverse position of said guide spot with respect to said track,
    means, responsive to said first tracking error signal, for controlling said common adjusting element, and thereby controlling the transverse position of said guide spot, and
    means for causing the position of the scan spot to be responsive to said common adjusting element, thereby coupling the transverse position of the scan spot in said selected recording plane to said transverse position of said guide spot, and
    at least one spherical aberration corrector disposed for adjustable correction of spherical aberration in said scanning beam only.

28. An apparatus as claimed in claim 27, wherein said means for producing and focusing a scanning beam comprises a scanning radiation source and a scanning beam optical element, and the apparatus further comprises a scanning beam detector and means for converging a portion of said scanning beam coming from said optical record carrier onto said scanning beam detector,
  characterized in that said at least one spherical aberration corrector comprises a first spherical aberration corrector having an adjustable correction, arranged in a diverging portion of said scanning beam between said scanning radiation source and said scanning beam optical element, and
  a second spherical aberration corrector having an adjustable correction, arranged in a converging portion of said portion of said scanning beam between said means for converging a portion and said detector.

29. An apparatus as claimed in claim 28, wherein said means for producing a guide beam includes a guide beam radiation source and a guide beam optical element, and said means for generating a first tracking error signal includes a guide beam detector and means for converging said part of said guide beam onto said guide beam detector,
  characterized by further comprising a third spherical aberration corrector having a fixed correction, arranged in a diverging portion of said guide beam between said guide beam radiation source and said guide beam optical element, and
  a fourth spherical aberration corrector having a fixed correction, arranged in a converging portion of said part of said guide beam between said means for converging said part and said guide beam detector.

30. An apparatus as claimed in claim 27, characterized in that said at least one spherical aberration corrector comprises at least one transparent plate, and means for moving the at least one plate into and out of the scanning beam path.

31. An apparatus as claimed in claim 27, characterized in that said at least one Spherical aberration corrector comprises a transparent plate having a plurality of areas of different thicknesses, a selected one of said areas being present in the scanning beam path.

* * * * *